(12) United States Patent
Dix

(10) Patent No.: US 11,904,664 B2
(45) Date of Patent: Feb. 20, 2024

(54) SUNVISOR ASSEMBLY

(71) Applicant: NISSAN NORTH AMERICA, INC., Franklin, TN (US)

(72) Inventor: Jeffery Dix, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 17/852,311

(22) Filed: Jun. 28, 2022

(65) Prior Publication Data

US 2023/0415550 A1   Dec. 28, 2023

(51) Int. Cl.
*B60J 3/02* (2006.01)
*B62D 29/00* (2006.01)
*B62D 25/06* (2006.01)
*B60R 13/02* (2006.01)

(52) U.S. Cl.
CPC ............. *B60J 3/0217* (2013.01); *B60J 3/023* (2013.01); *B60R 13/0212* (2013.01); *B62D 25/06* (2013.01); *B62D 29/00* (2013.01)

(58) Field of Classification Search
CPC ......... B60J 3/0217; B60J 3/023; B62D 29/00; B62D 25/06
USPC ........................................................ 296/97.9
See application file for complete search history.

(56) References Cited

U.S. PATENT DOCUMENTS

| | | | | |
|---|---|---|---|---|
| 2,939,741 A * | 6/1960 | Keating | ................. | B60J 3/0217 403/65 |
| 3,017,217 A * | 1/1962 | Keating | ................. | B60J 3/0221 D3/10 |
| 3,767,256 A * | 10/1973 | Sarkees | .................. | B60J 3/0217 248/289.11 |
| 5,031,952 A * | 7/1991 | Miyamoto | ............. | B60J 3/0204 296/97.4 |
| 5,201,564 A * | 4/1993 | Price | ..................... | B60J 3/0217 296/97.9 |
| 5,829,817 A * | 11/1998 | Ge | ......................... | B60J 3/0221 248/289.11 |
| 8,020,914 B2 * | 9/2011 | Burns | .................... | B60J 3/0217 296/97.9 |
| 2002/0089210 A1 * | 7/2002 | Beaver | .................. | B60J 3/0221 296/97.9 |
| 2006/0261628 A1 * | 11/2006 | Lanser | .................. | B60J 3/0221 296/97.9 |

* cited by examiner

*Primary Examiner* — Amy R Weisberg
*Assistant Examiner* — Veronica M Shull
(74) *Attorney, Agent, or Firm* — Global IP Counselors, LLP

(57) ABSTRACT

A vehicle includes a ceiling structure for a passenger compartment of the vehicle. The ceiling structure has an opening. The vehicle further includes a sunvisor assembly that is mounted to the ceiling structure. The sunvisor assembly has a panel and a swivel rod received by the opening to attach the panel to the ceiling structure. The swivel rod is movable from a first position to a second position upon receiving a predetermined force to the panel. The second position is a position in which the swivel rod is positioned further into the opening of the ceiling structure than when in the first position.

13 Claims, 7 Drawing Sheets

SUNVISOR ASSEMBLY

BACKGROUND

Technical Field

The present disclosure generally relates to a sunvisor assembly. More specifically, the present disclosure relates to a sunvisor assembly that is equipped with an energy absorption assembly.

Background Information

The automotive industry is constantly re-engineering and re-designing many of the components and structures within a vehicle in order to absorb energy in the form of forward momentum of objects within the vehicle. One area of re-designing interest relates to considering the effects of a sudden stop or impact event on very tall vehicle operators or tall passengers within a vehicle.

SUMMARY

In view of the state of the known technology, one aspect of the present disclosure is to provide a vehicle comprising a ceiling structure and a sunvisor assembly. The ceiling structure is for a passenger compartment of the vehicle. The ceiling structure has an opening. The sunvisor assembly is mounted to the ceiling structure. The sunvisor assembly has a panel and a swivel rod received by the opening to attach the panel to the ceiling structure. The swivel rod is movable from a first position to a second position upon receiving a predetermined force to the panel. The second position is a position in which the swivel rod is positioned further into the opening of the ceiling structure than when in the first position.

In view of the state of the known technology, another aspect of the present disclosure is to provide a vehicle sunvisor assembly comprising a mount, a panel and a swivel rod. The mount is configured to be mounted to a ceiling structure of a vehicle passenger compartment. The swivel rod extends from the mount. The swivel rod is movable relative to the mount from a first position to a second position upon receiving a predetermined force to the panel. The second position is a position in which a length of the swivel rod that is received by the mount is greater than a length of the swivel rod that is received by the mount when in the first position.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
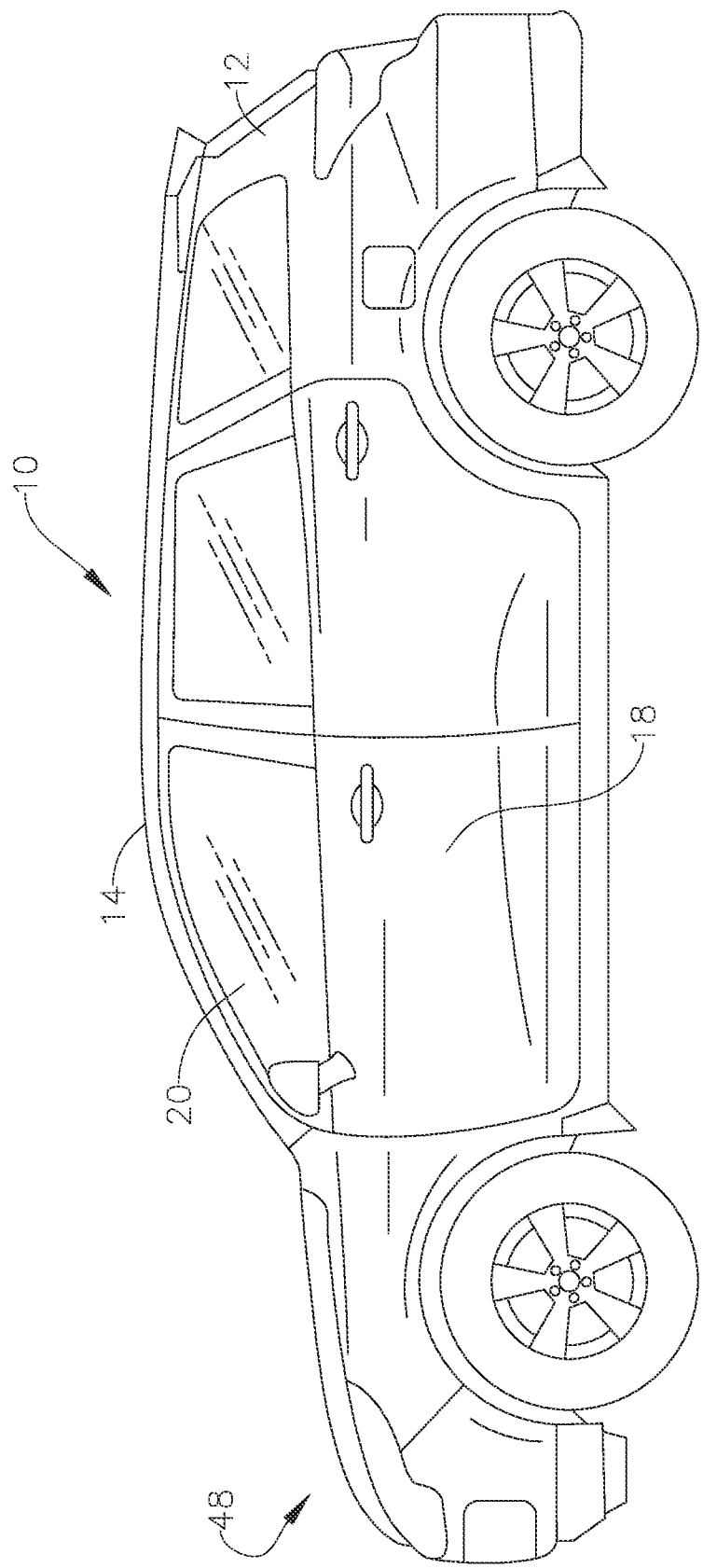
FIG. 1 is a side plan view of a vehicle.
Figure 2:
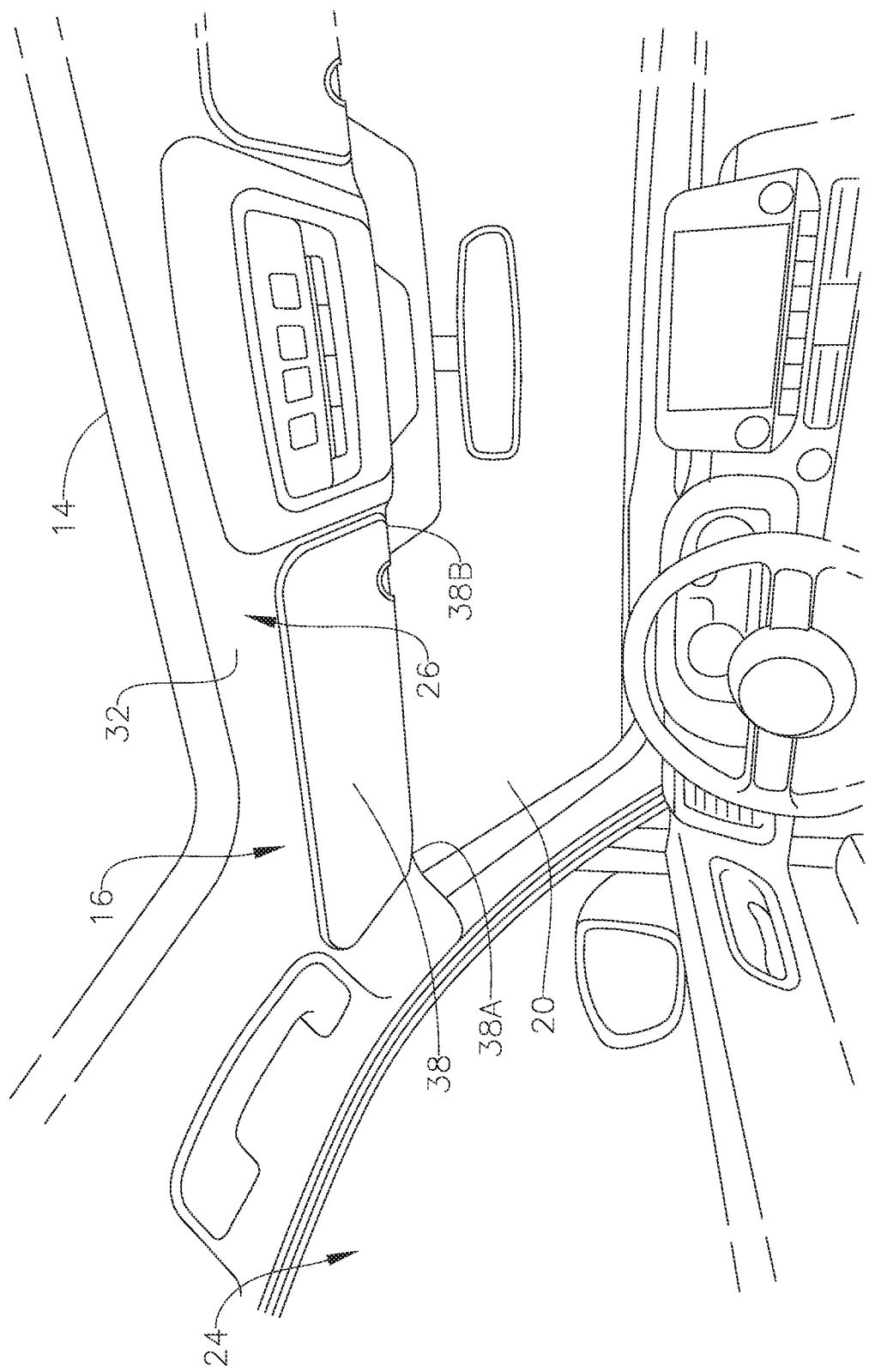
FIG. 2 is a perspective view of a passenger compartment of the vehicle equipped with a sunvisor assembly mounted to a ceiling structure.

Referring initially to FIGS. 1 and 2, a vehicle 10 having a vehicle body structure 12 that includes a roof structure 14 and a sunvisor assembly 16 is illustrated in accordance with a first embodiment. The vehicle body structure 12 includes many conventional features, such as doors 18 and a windscreen 20 made of a laminated glass material.

As seen in FIG. 2, a vehicle passenger compartment 24 is illustrated having a ceiling structure 26. Therefore, the vehicle 10 comprises the ceiling structure 26 for the passenger compartment 24 of the vehicle 10. The ceiling structure 26 at least partially defines an interior of the vehicle 10. The vehicle 10 further comprises the sunvisor assembly 16 that is mounted to the ceiling structure 26.

Figure 3:
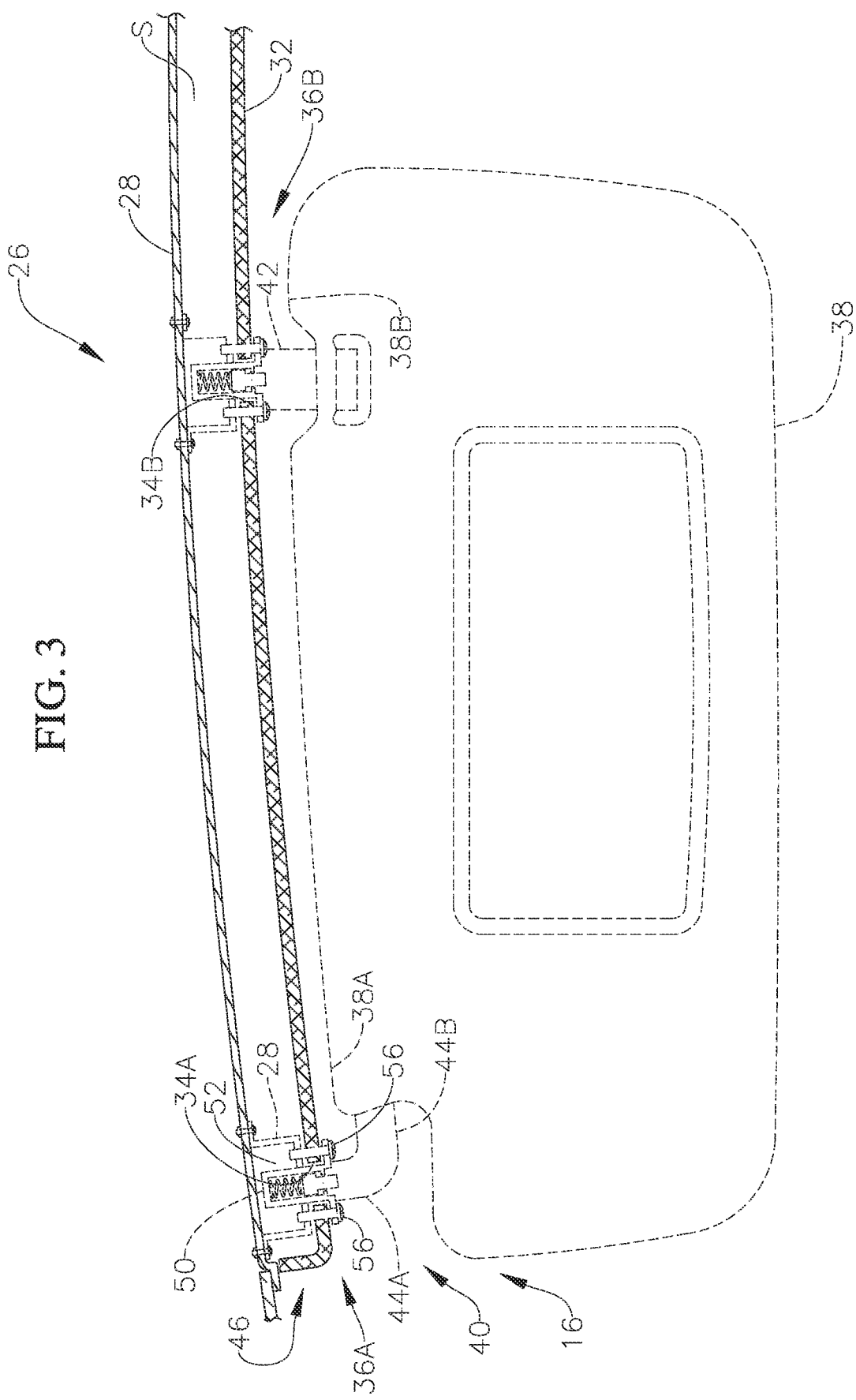
FIG. 3 is an enlarged view of the sunvisor assembly and a partial cross-sectional view of the ceiling structure.
Figure 4:
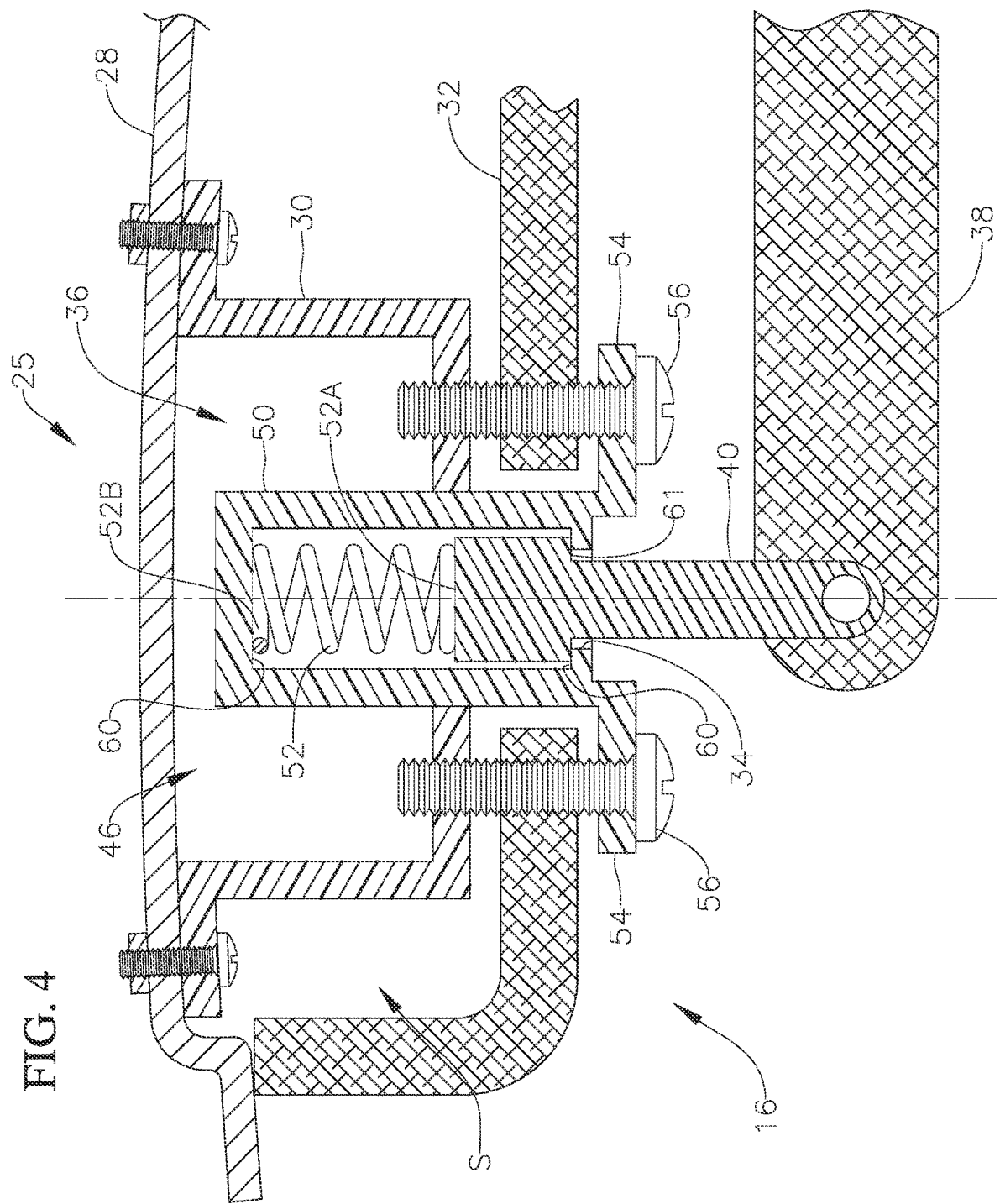
FIG. 4 is an enlarged cross-sectional view of an energy absorption assembly of the sunvisor assembly with a swivel rod in a rest position.

As best seen in FIGS. 2 to 4, the ceiling structure 26 further includes a roof panel 28 that is part of the roof structure 14 and primarily defines the outer roof structure 14. As shown, the roof panel 28 includes a metal panel. Alternatively speaking, the roof panel 28 is made of a metal panel such as steel or aluminum. The ceiling structure 26 can includes a plurality of roof bows 28 such as a forward roof bow 28 shown. The ceiling structure 26 further includes a headliner 32 that conceals the roof bows 28 (forward roof bow 28) and the roof panel 28. The roof bow 28 can be attached to the roof panel 28 by fasteners 56 and weld nuts.

The headliner 32 is installed along an interior side of the roof panel 28. The headliner 32 includes color-coordinated soft fabric. Preferably, the headliner 32 includes a fabric panel. Alternatively speaking, the headliner 32 is made of fabric. The headliner 32 serves to provide insulation against heat and noise, and can also hide wiring and hardware for electrical components, antennas and other accessories. The headliner 32 can also cover foam insulation for the ceiling structure 26. On some vehicles, the foam insulation is integrated into the fabric of the headliner 32. The headliner 32 can include clips and screws for light assemblies, grab handles and sunvisors.

Figure 5:
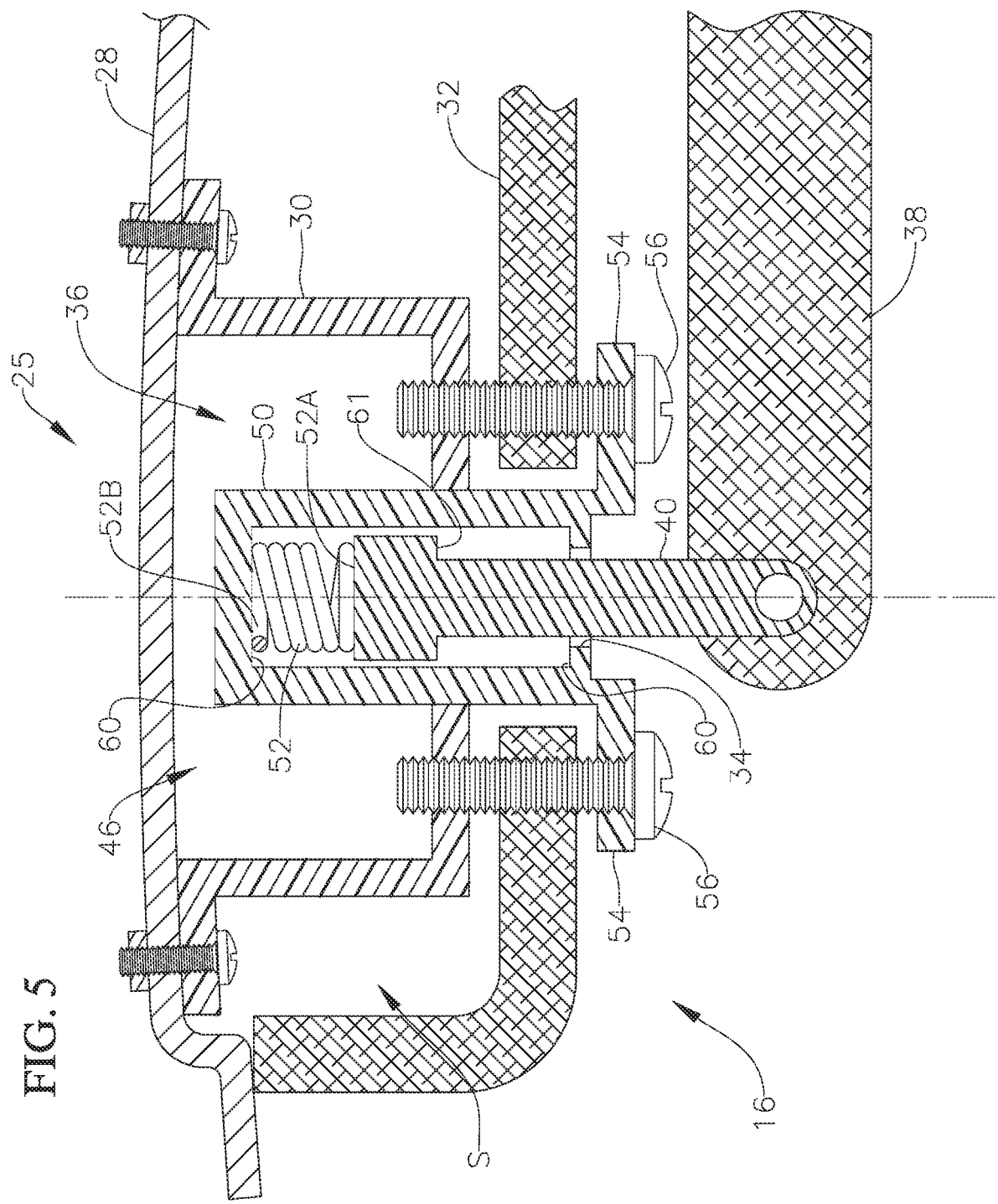
FIG. 5 is an enlarged cross-sectional view of an energy absorption assembly of the sunvisor assembly with the swivel rod in an operated position.

As shown, the sunvisor assembly 16 is assembled to the headliner 32. As best seen in FIGS. 4 and 5, the ceiling structure 26 has an opening 34 for receiving a mount 36 for the sunvisor assembly 16. In particular, the headliner 32 includes the opening 34 that is the mount 36 for the sunvisor assembly 16. More preferably, the headliner 32 includes a pair of openings 34A and 34B for the sunvisor assembly 16, as shown in FIG. 3. The sunvisor assembly 16 includes a pair of mounts 36A and 36B that mount the components of the sunvisor assembly 16 to the ceiling structure 26.

Figure 6:
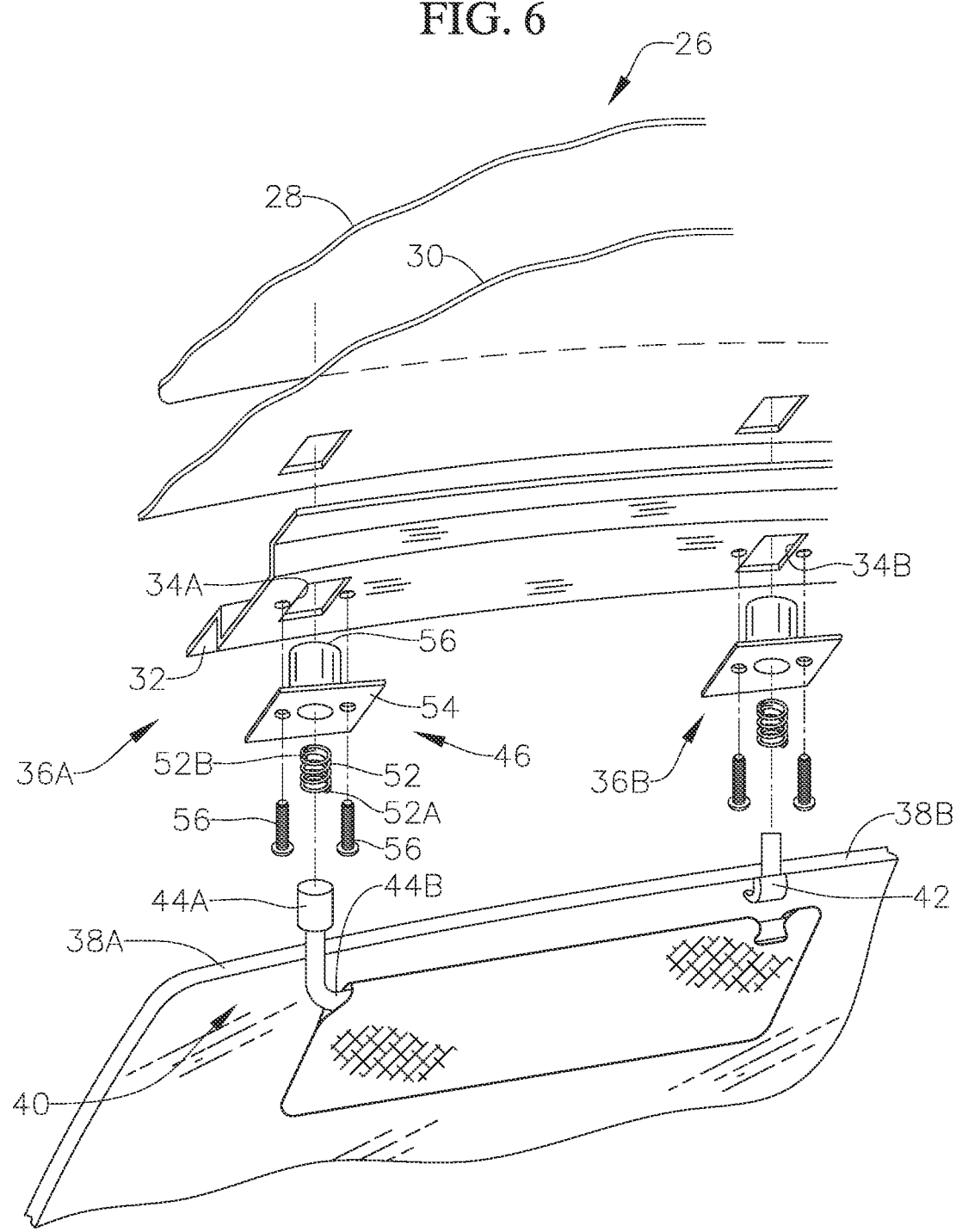
FIG. 6 is an exploded view of the sunvisor assembly and the ceiling structure.
Figure 7:
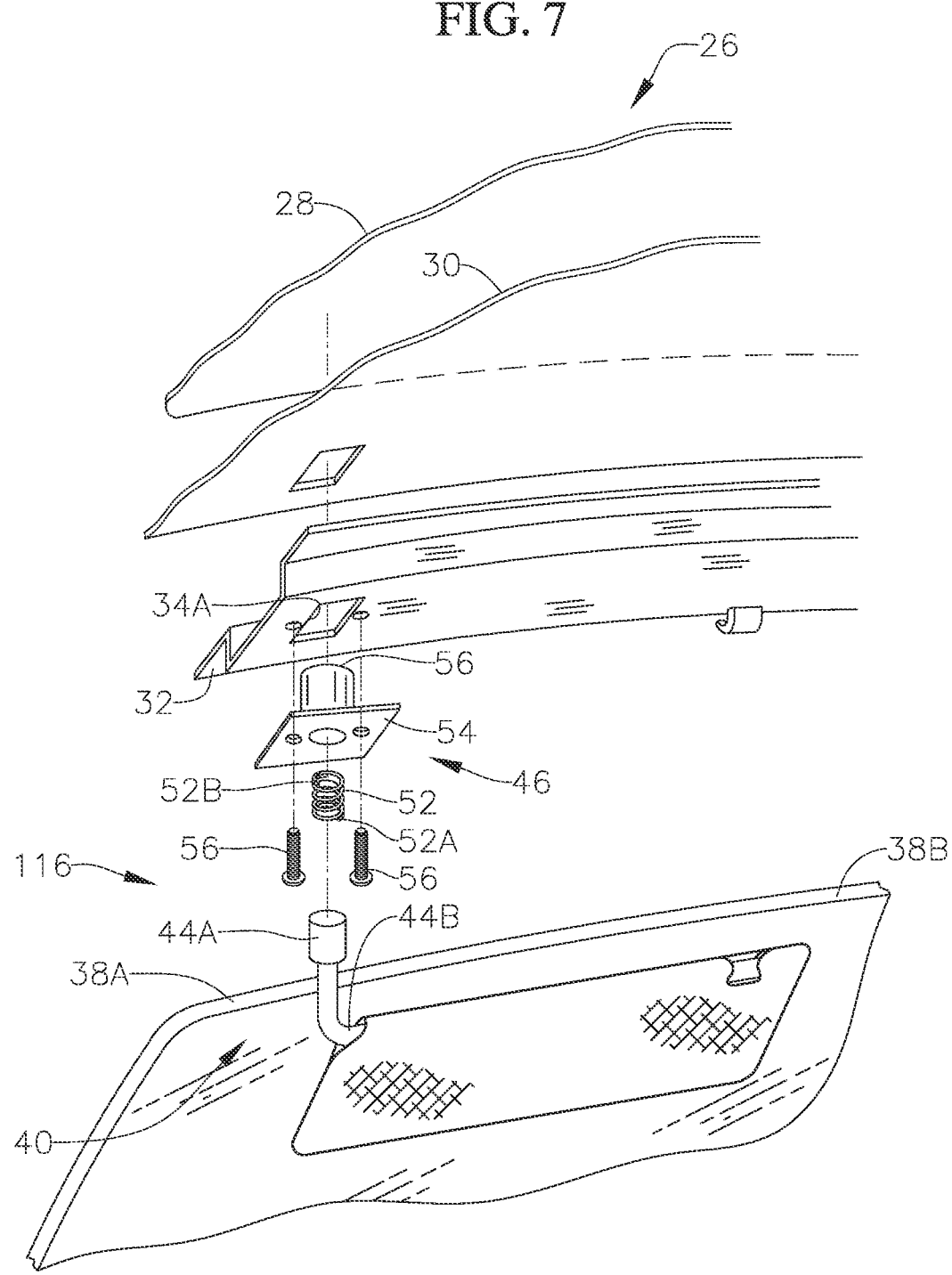
FIG. 7 is an exploded view of a modified sunvisor assembly and the ceiling structure.

As seen in FIG. 6, the sunvisor assembly 16 includes a first mount 36A that is received by a first of the openings 34A and a second mount 36B that is received by a second of the openings 34B, as will be further described below. As shown in FIG. 3, the first mount 36A is received in a space S between the roof panel 28 and the headliner 32. The second mount 36B is received in the space S between the roof panel 28 and the headliner 32. The sunvisor assembly 16 in the illustrated embodiment is a driver's side sunvisor assembly. However, it will be apparent to those skilled in the vehicle field from this disclosure that the structure and arrangement discussed herein can be applied to the passenger's side sunvisor assembly.

As best seen in FIG. 3, the sunvisor assembly 16 has a panel 38 and a swivel rod 40 received by the opening to attach the panel 38 to the ceiling structure 26. The sunvisor further includes a hook 42. The swivel rod 40 is mounted to ceiling structure 26 by the first mount 36A and the hook 42 is mounted to the ceiling structure 26 by the second mount 36B. As shown in FIGS. 2 and 3, the sunvisor panel 38 is made from a rigid panel 38 such a plastic that is covered with a durable, decorative fabric material or finish. The sunvisor panel 38 can include an optional mirror and/or light. The sunvisor panel 38 includes a top surface having a first end 38A and a second end 38B. The sunvisor panel 38 is fixedly mounted to the first mount 36A at generally the first end 38A and is removably mounted to the second mount 36B at generally the second end 38B.

The swivel rod 40 has a shaft 44 extending from the first mount 36A. The swivel rod 40 fixes the first end 38A of the sunvisor panel 38 to the first mount 36A. The sunvisor panel 38 is pivotable with respect to the ceiling structure 26 by the swivel rod 40. In the illustrated embodiment, the first mount 36A is preferably a swivel mount that allows a range of motion for the swivel rod 40 that extends therefrom. The swivel rod 40 extends through the sunvisor panel 38 and is hooked onto the hook 42 at the second end 38B.

The shaft 44 of the swivel rod 40 is an L-shaped shaft 44 having a first portion 44A and a second portion 44B. The first portion 44A and second portions 44B of the shaft 44 extends substantially transverse with respect to each other to form the L-shape. The first portion 44A is received by the housing 50 and the second portion 44B extends through the sunvisor panel 38. The first and second portions 44A and 44B of the shaft 44 is preferably formed as a one-piece member made of plastic. The second portion 44B is hooked the hook 42 to detachably attach the sunvisor panel 38 to the ceiling structure 26 at the second end of the sunvisor panel 38.

In the illustrated embodiment, the sunvisor assembly 16 further includes an energy absorption assembly 46. In particular, the energy absorption assembly 46 enables displacement of the sunvisor panel 38 from a rest position in a vehicle forward direction. In the event that the sunvisor panel 38 makes contact with an occupant's head during impact, the energy absorption assembly 46 enables the sunvisor panel 38 to move in the vehicle forward direction to reduce the shock of impact to the occupant's body. Therefore, the sunvisor panel 38 is capable of a forward stroke upon receiving a predetermined impact from an occupant. In the illustrated embodiment, the term "vehicle forward direction" refers to a direction towards a front end 48 of the vehicle 10. In the illustrated embodiment, the sunvisor assembly 16 includes a pair of energy absorption assemblies 46 that are provided at either sides of the sunvisor panel 38. However, it will be apparent to those skilled in the vehicle field that the sunvisor assembly 16 can be equipped with a single energy absorption assembly 46 to perform a forward stroke movement as desired.

In the illustrated embodiment, the sunvisor assembly 16 includes a pair of energy absorption assemblies 16 for the first and second ends of the sunvisor panel 38. As the energy absorption assemblies 16 are identical, only the energy absorption assembly 46 will be further discussed herein. Referring to FIGS. 4 and 5, the energy absorption assembly 46 includes a housing 50, a biasing member 52 and the swivel rod 40. The housing 50 is mounted between the headliner 32 and the roof panel 28. As shown, the housing 50 is positioned in a space S between the headliner 32 and the roof panel 28. In the illustrated embodiment, the housing 50 is fixed to both the forward bow 30 and the headliner 32. In particular, the housing 50 is preferably fixed to the components of the ceiling structure 26 by one or more fasteners 56, as shown.

As best seen in FIG. 4, the housing 50 includes a collar 54 that is positioned on a passenger compartment 24 side of the headliner 32. The collar 54 is defined by one or more flanges. The fasteners 56 extend through the collar 54 and through portions of the roof bow 28 to fix the housing 50 relative to the headliner 32 and the roof bow 28. The attachment of the housing 50 relative to the ceiling structure 26 is illustrated an example only. It will be apparent to those skilled in the vehicle field from this disclosure that the housing 50 can be fixed to the ceiling structure 26 by other means or by swivels. It will also be apparent to those skilled in the vehicle field from this disclosure that the housing 50 can alternatively be attached to the roof panel 28 directly as desired and/or necessary.

The housing 50 receives the swivel rod 40 therethrough. Alternatively speaking, the housing 50 houses the swivel rod 40. In this way, the housing 50 defines the first mount 36A for the energy absorption assembly 46. The swivel rod 40 extends from the mount 36 towards the interior of the vehicle 10. In the illustrated embodiment, the swivel rod 40 is movable from a first position to a second position upon receiving predetermined force to the panel 38. As seen in FIG. 4, the first position is the rest position of the swivel rod 40. In the rest position, the swivel rod 40 is not under stress. The second position is a position in which the swivel rod 40 is positioned further into the opening of the ceiling structure 26 than when in the first position. As shown, the swivel rod 40 is positioned closer to the roof panel 28 when in the second position than when in the first position.

The housing 50 includes an upstream surface 58 and a downstream surface 60 that is closer to the roof panel 28 than the upstream surface 58 is to the roof panel 28. Preferably, the first portion 44A of the swivel rod 40 abuts the upstream surface 58 when in the first position, as seen in FIG. 4. The swivel rod 40 can include one or more abutment surfaces 61 to abut the upstream surface 58 of the housing 50. The abutment surfaces 61 define a stopper for the swivel rod 40. In other words, the head of the first portion 44A of the swivel rod 40 that is received by the housing 50 has a larger diameter than the opening 34.

As shown, the swivel rod 40 moves downstream so to be spaced from the upstream surface 58 when in the second position, as seen in FIG. 5. Alternatively speaking, the second position is a position in which a length of the swivel rod 40 that is received by the mount 36 is greater than a length of the swivel rod 40 that is received by the mount 36 when in the first position. Thus, the swivel rod 40 moves from the downstream surface 60 towards the upstream surface 58 during a stroke upon receiving a predetermined impact from the vehicle's 10 occupant.

Therefore, the swivel rod 40 is movable relative to the mount 36 from the first position to the second position upon receiving a predetermined force to the panel 38. Preferably, the swivel rod 40 has a minimum stroke length of ten (10) millimeters. That is, the swivel rod 40 can move at least 10 millimeters within the housing 50. More preferably, the swivel rod 40 has a stroke length of up to twenty-five (25) millimeters.

The biasing member 52 biases the swivel rod 40 into the first position, which is the rest position. As shown, the biasing member 52 is disposed in the housing 50 and operatively contacts the swivel rod 40. The biasing member 52 has a first end 52A connected to the downstream surface 60 of the housing 50. The biasing member 52 has a second end 52B connected to the swivel rod 40. In the illustrated embodiment, the biasing member 52 is a coil spring. It will be apparent to those skilled in the vehicle field from this disclosure that the biasing member 52 can alternatively include fluid or gas elements for biasing the swivel rod 40 into the first position, as necessary and/or desired.

Referring now to FIG. 8, a modified sunvisor assembly 116 that can be implemented with the vehicle 10 is illustrated. The modified sunvisor assembly 116 is identical to the sunvisor assembly 16 of FIGS. 1 to 7, except that the modified sunvisor assembly 116 includes only a single energy absorption assembly 46. It will be apparent to those skilled in the vehicle field from this disclosure that the sunvisor assembly 16 can be modified to have one or more energy absorption assemblies to enable a forward moving stroke of the sunvisor panel 38, as needed and/or desired. Due to the similarity between the modified sunvisor assembly 116 and the sunvisor assembly 16, identical components of the modified sunvisor assembly 116 will receive the same reference numerals as the sunvisor assembly 16.

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the sunvisor assembly. Accordingly, these terms, as utilized to describe the present invention should be interpreted relative to a vehicle equipped with the sunvisor assembly.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle comprising:
a ceiling structure for a passenger compartment of the vehicle, the ceiling structure having an opening; and
a sunvisor assembly mounted to the ceiling structure, the sunvisor assembly having a panel and a swivel rod received by the opening to attach the panel to the ceiling structure, the swivel rod being movable from a first position to a second position upon receiving a predetermined force to the panel, the second position being a position in which the swivel rod is positioned further into the opening of the ceiling structure than when in the first position, the sunvisor assembly further comprises a biasing member, the swivel rod and the panel being spring-loaded into the first position by the biasing member.

2. The vehicle according to claim 1, wherein the ceiling structure includes a headliner, the headliner including a fabric panel.

3. The vehicle according to claim 2, wherein the ceiling structure further includes a roof panel, the roof panel including a metal panel.

4. The vehicle according to claim 3, wherein the swivel rod is positioned closer to the roof panel when in the second position than when in the first position.

5. The vehicle according to claim 3, wherein the sunvisor assembly further comprises a housing for the swivel rod, the housing being positioned in a space between the headliner and the roof panel.

6. The vehicle according to claim 1, wherein the biasing member is disposed in the housing and operatively contacts the swivel rod.

7. The vehicle according to claim 6, wherein the housing of the biasing member includes an upstream surface and a downstream surface that is closer to the roof panel than the upstream surface is to the roof panel, the swivel rod abutting the upstream surface when in the first position.

8. The vehicle according to claim 7, wherein the swivel rod is spaced from the upstream surface when in the second position.

9. A vehicle sunvisor assembly comprising:
a mount configured to be mounted to a ceiling structure of a vehicle passenger compartment;
a panel;
a swivel rod extending from the mount, the swivel rod being movable relative to the mount from a first position to a second position upon receiving a predetermined force to the panel, the second position being a position in which a length of the swivel rod that is received by the mount is greater than a length of the swivel rod that is received by the mount when in the first position; and
a biasing member, the panel and the swivel rod being spring-loaded into the first position by the biasing member.

10. The vehicle sunvisor assembly according to claim 9, wherein
the mount includes a housing for the swivel rod, the swivel rod being movable relative to the housing.

11. The vehicle sunvisor assembly according to claim 9, wherein
 the biasing member is disposed in the housing and operatively contacts the swivel rod.

12. The vehicle sunvisor assembly according to claim 11, wherein
 the housing includes an upstream surface and a downstream surface, the swivel rod abutting the upstream surface when in the first position.

13. The vehicle sunvisor assembly according to claim 12, wherein
 the swivel rod is spaced from the upstream surface when in the second position.

\* \* \* \* \*